United States Patent
Srnec et al.

(10) Patent No.: US 10,596,878 B2
(45) Date of Patent: Mar. 24, 2020

(54) SYSTEMS AND METHODS FOR MANAGEMENT OF ETRU

(71) Applicant: Thermo King Corporation, Minneapolis, MN (US)

(72) Inventors: Matthew Srnec, Minnetonka, MN (US); Russell L. Sanders, Minnetonka, MN (US); Shawn Alan Schemmel, Bloomington, MN (US); Matthew S. Nelson, Cottage Grove, MN (US); Mark P Weber, Oakdale, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 15/941,772

(22) Filed: Mar. 30, 2018

(65) Prior Publication Data

US 2019/0299750 A1 Oct. 3, 2019

(51) Int. Cl.
| | |
|---|---|
| *B60H 1/32* | (2006.01) |
| *H04L 29/08* | (2006.01) |
| *H04W 4/80* | (2018.01) |
| *H02J 13/00* | (2006.01) |
| *H02J 3/14* | (2006.01) |
| *F25D 29/00* | (2006.01) |

(52) U.S. Cl.
CPC ......... *B60H 1/3211* (2013.01); *F25D 29/003* (2013.01); *H02J 3/14* (2013.01); *H02J 13/00* (2013.01); *H04L 67/1068* (2013.01); *H04L 67/125* (2013.01); *H04W 4/80* (2018.02); *B60H 2001/3255* (2013.01)

(58) Field of Classification Search
None
See application file for complete search history.

(56) References Cited

U.S. PATENT DOCUMENTS

| | | | |
|---|---|---|---|
| 5,437,163 | A | 8/1995 | Jurewicz et al. |
| 6,067,482 | A | 5/2000 | Shapiro |
| 6,502,409 | B1 | 1/2003 | Gatling et al. |
| 6,647,735 | B2 | 11/2003 | Street et al. |
| 6,679,071 | B1 | 1/2004 | Storey et al. |
| 6,975,926 | B2 | 12/2005 | Schanin |
| 7,812,733 | B2 | 10/2010 | Perten et al. |
| 8,590,330 | B2 | 11/2013 | Walker et al. |

(Continued)

FOREIGN PATENT DOCUMENTS

| | | |
|---|---|---|
| WO | WO 03/021163 A1 | 3/2003 |
| WO | 2008086425 A2 | 7/2008 |
| WO | 2014055530 A1 | 4/2014 |

OTHER PUBLICATIONS

Can the Electrical Grid Handle Electric Trucks?, from http://www.truckinginfo.com/channel/fuel-smarts/article/story/2018/02/can-the-electrical-grid-handle-electric-trucks.aspx, Dated Feb. 19, 2018.

(Continued)

*Primary Examiner* — Ramesh B Patel
(74) *Attorney, Agent, or Firm* — Hamre, Schumann, Mueller & Larson, P.C.

(57) ABSTRACT

Embodiments of systems and methods for power demand management are described herein. One or more embodiments comprise peer to peer short range wireless communications. One or more embodiments comprise BLE advertising channel features. Other embodiments are also described herein.

20 Claims, 5 Drawing Sheets

(56) References Cited

U.S. PATENT DOCUMENTS

| | | | | |
|---|---|---|---|---|
| 8,849,723 | B2* | 9/2014 | Robinson | G06Q 10/08 340/539.13 |
| 9,342,082 | B2 | 5/2016 | Guenette et al. | |
| 9,434,237 | B2 | 9/2016 | Olaleye | |
| 2006/0123807 | A1 | 6/2006 | Sullivan et al. | |
| 2007/0220907 | A1 | 9/2007 | Ehlers | |
| 2010/0257115 | A1* | 10/2010 | Robinson | G06Q 10/08 705/332 |
| 2011/0156877 | A1 | 6/2011 | Wong et al. | |
| 2011/0276826 | A1* | 11/2011 | Schoppmeier | H04L 1/1896 714/16 |
| 2011/0301762 | A1* | 12/2011 | Walker | F25D 29/003 700/275 |
| 2012/0137713 | A1 | 6/2012 | Duraisamy et al. | |
| 2012/0167605 | A1 | 7/2012 | Ikemiya et al. | |
| 2012/0229089 | A1* | 9/2012 | Bemmel | H02J 7/0013 320/109 |
| 2014/0144164 | A1* | 5/2014 | Steele | B60H 1/00364 62/115 |
| 2015/0292784 | A1* | 10/2015 | Yamanis | H02J 3/381 62/236 |
| 2016/0164288 | A1 | 6/2016 | Yang et al. | |
| 2016/0253406 | A1* | 9/2016 | Schmitz | G06Q 10/06 707/740 |
| 2019/0120530 | A1* | 4/2019 | Chopko | F25B 27/00 |

OTHER PUBLICATIONS

Marine power management system—K-Chief 600, from https://www.km.kongsberg.com/ks/web/nokbg0240.nsf/AllWeb/A297BDC3A79BBB36C125726B00387597?OpenDocument, Retrieved Jun. 5, 2018.

Solar power's greatest challenge was discovered 10 years ago. It looks like a duck. Found at https://www.vox.com/energy-and-environment/2018/3/20/17128478/solar-duck-curve-nrel-researcher, Dated Mar. 31, 2018.

Ship power management system, found at https://www.comap.cz/applications/detail/Ship-power-management-system/, Dated Aug. 2016.

Understanding Power Management System: How to Reduce Power Consumption on Ships, Found at http://www.marineinsight.com/tech/understanding-power-management-system-how-to-reduce-power-consumption-on-ships/, Dated Oct. 27, 2017.

11. PowerMax Solutions, Published by SEL Engineering Services, No. 385-0053, Dated 2017.

4. SAE • J2497; Jul. 30, 2012; Power Line Communications for Commercial Vehicles, Published by SAE International, Dated Jul. 2012.

European Search Report dated May 17, 2019, Application No. 19166647.8, Filed Apr. 1, 2019.

* cited by examiner

SYSTEMS AND METHODS FOR MANAGEMENT OF ETRU

FIELD OF THE INVENTION

The present invention relates to systems and methods for the management of electronically powered transport refrigeration units start up and/or run cycles.

BRIEF DESCRIPTION OF THE DRAWINGS

To facilitate further description of the embodiments, the following drawings are provided. The same reference numerals in different figures denote the same elements.

DETAILED DESCRIPTION

In an embodiment, a system for power demand management comprises at least one eTRU, and a communications system; wherein the communications system communicates with one or more additional communications systems of one or more additional eTRUs; and wherein the at least one eTRU determines a priority to start compared to the one or more additional eTRUs.

In another embodiment, a method of power demand management comprises an eTRU sensing that it has connected to shore power; detecting one or more additional eTRUs in the vicinity; communicating with the one or more additional eTRUs a pending start; determining a priority of pending starts; and starting a refrigeration unit of the eTRU when it has priority over other the one or more additional eTRUs.

In yet another embodiment, a method for eTRU load side power demand management comprises connecting the eTRU to shore power; detecting a second eTRU in the vicinity; determining that the eTRU needs to power on a refrigeration unit; communicating to the second eTRU that the eTRU is in a state of pending start; determining whether the pending start of the eTRU has priority over any other pending starts; and powering on the refrigeration unit of the eTRU once the pending start of the eTRU has priority over the other pending starts. Other embodiments of systems and methods power demand management are also disclosed herein.

Electrically powered Transport Refrigeration Units (eTRU) can be powered via wired connections to domicile electrical power, such as, for example, when stationed at a drop site. An eTRU may be an all-electric system or may be a hybrid system, such as a unit with a diesel engine running mode and an electric motor for running on shore power in electric standby mode. When higher energy electrical loads start, such as when an eTRU starts, there is typically a large inrush current and voltage drop event. When multiple eTRUs are connected in parallel with a domicile's utility connection, occurrences of multiple, simultaneous load start events could result in extended, significant voltage drop or "brown-out" events. These events could affect the ability of the starting units and eTRUs that are already running to continue to operate. This could potentially result in large scale electrical system faults and loss of electrical power. eTRUs that are electrically powered either as a primary or secondary form of prime mover are not currently managed as networked or associated systems for load-side power use management. Management of these start events would be the most effective way to prevent brown-out conditions and assure continuous operation of these critical systems.

The benefits of an individual eTRU knowing the state of other associated eTRUs on a common electrical system may include management of staggered motor start events and predictive total load management. This may result in a more reliable electrical infrastructure where loads are actively managed and monitored. Examples of systems and methods of managing such an electric load, can comprise, for example connecting each of the eTRUs to a wireless network. A further example can comprise the eTRUs being self-managed with the ability to detect the states of other eTRUs. In each example, the systems can be designed to help eliminate or reduce simultaneous starting events. Wireless networking using mobile networks and cloud/remote host computing can result in an actively managed system that can tie in directly to a domiciles energy management system. Further examples can include the ability to create prioritized start/run events and alert network administrators and management to system alarms and specific eTRU requirements.

As an example, in some embodiments, knowledge of the one or more eTRU locations using GPS, Wi-Fi, or mobile network communications can determine co-location and common domicile electrical system use without a physical, wired connection or human interaction. Furthermore, this can support automated management and reporting of compliance information for TRU emissions as required and, once connected to the domicile electrical system, assume automatic control over the eTRU operation for load management. It should be noted that GPS, Wi-Fi, and mobile network communication is not an exhaustive list of ways to determine eTRU location.

Furthermore, according to some embodiments, self-managed eTRUs that are capable of determining which eTRUs are in the local vicinity can monitor the changing states of the local eTRUs. As such, the eTRUs in the local vicinity can make decisions on when to start. This non-network approach can improve performance without creating security issues typical of device networking.

In the same or other embodiments, networked eTRUs are enabled by terrestrial mobile, Wi-Fi, satellite, or short-range peer-to-peer wireless networks. These eTRUs can report their status to a central network administration system. The data reported can include, such as, for example, location, eTRU ID, state of operation, errors, run hours, fuel level, cargo status, and/or other typically reported data associated with eTRU operation. The central network can use GPS location and/or Wi-Fi or networking location data to group eTRUs into site-specific operational profiles. These profiles are managed based on, for example, eTRU requirement to start, run status, and location electrical grid status. The control system could be made to stagger eTRU start events, limit run time, and address critical loads using load profiles or other means to determine power distribution need vs request.

In some embodiments, self-managed eTRUs are possible by creating a short range wireless monitoring algorithm that can broadcast the eTRU status as a "beacon" or non-networked wireless status message and read other "beacons" in the general area. A table of eTRUs within wireless range can be established in the individual eTRU control system. Furthermore, the states of the other eTRUs can be monitored.

For example, if an individual eTRU requires a start, it can review the status table of the other local eTRUs and queue itself to start based on the status of other "pending start," "running," or "pending shutdown" unit status. It should be noted that these status indications are merely exemplary and other indications may be used. It would then start the eTRU once it moved to the front of the internal queue. The waiting to start algorithm may also include a timeout, temperature based, or other state change requirement feature that would start the unit following a timeout period. This would prevent loss of temperature management and may also act as a security feature against bad actors or fake beacons.

In some examples, data from self-managed eTRUs could still be communicated to a central server via other wireless systems that are networked. Such a solution would allow for a standardized control system for eTRUs that could be used regardless of eTRU brand or ownership, as it eliminates the need to network eTRUs and would allow for a standard device management format.

Furthermore, according to some embodiments, adjacent BLE wireless channels, for example, can be used to re-broadcast a status table that has been compiled of local devices. This table could be used by a receiving unit to update its own table. Such a set-up could allow for the propagation of the queue throughout the facility without the need to directly connect each unit to a network.

In one example, the table could be maintained and prioritized. It could also be sent by the individual unit telematics to a host to monitor the overall site for compliance to eTRU regulations due to the time-stamped message format.

This local networking could follow existing Bluetooth Beacon/Advertising standards or utilize other short range wireless networking technologies.

Figure 1:
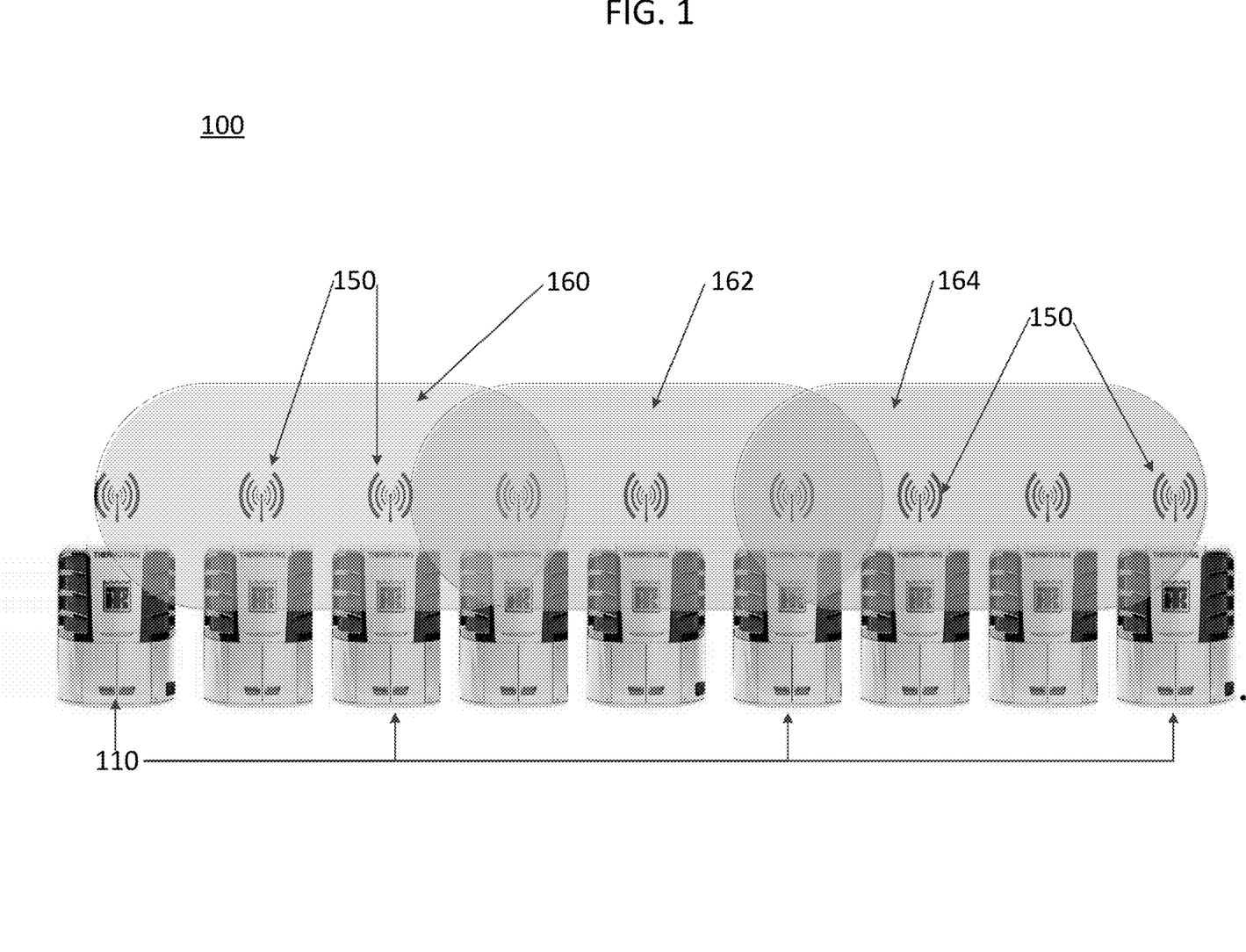
FIG. 1 illustrates an example of a system for eTRU power demand management, according to an embodiment.

Turning to the drawings, FIG. 1 illustrates an overview of a system 100 for eTRU power demand management, according to an embodiment. System 100 is merely exemplary and is not limited to the embodiment presented herein. System 100 can be employed in many different embodiments or examples not specifically depicted or described herein.

System 100 can comprise 1 or more eTRUs 110. Although there are nine eTRUs 110 shown in the example of FIG. 1, there can be more or less eTRUs. In some examples, the eTRUs 110 of system 100 are all located at a single site. The site can be any site in which there may be multiple eTRUs needing shore power. For example, the site can be a warehouse, a truck stop, a drop site, etc. Furthermore, in some embodiments, some locations (such as, for example, a warehouse) can have more than one site.

A hybrid network concept could also be created where some devices were allowed to network with each other, but others operated using the beacon method without networking.

As shown in FIG. 1, each of the eTRUs can comprise a wireless communication system 150. In some embodiments, the communication system can comprise peer to peer communication. In the same or other embodiments, the communication system can comprise Bluetooth Low Energy (BLE) communications. It should be noted that although peer to peer networking and BLE advertising are specifically mentioned herein, other types of wireless communications can be used without departing from the scope of this invention.

In system 100, the communication systems 150 of the eTRUs 110 communicate with each other. The communication systems work together to form a localized network 160. In some embodiments, the limited range of the communication systems limit the range of the localized network 160. As such, more than one network, such as for example, 162 and 164 will also be created. In such an example, an eTRU 110 with communication system 150 in network 160 may be able to reach another eTRU 110 with communication system 150 that is in network 162. In such an example, information/data may be passed from network 160 to 162. Therefore, even though all eTRUs 110 with communication systems 150 in network 160 may not have the range to reach all the communications systems 150 of network 162, all eTRUs 110 in networks 160 and 162 may receive the same data as each other due to one or more eTRUs 110 being within range of both networks 160 and 162.

Similarly, an eTRU 110 with communication system 150 in network 162 may be able to reach another eTRU 110 with communication system 150 that is in network 164. In such an example, information/data may be passed from network 162 to 164. Therefore, even though all eTRUs 110 with communication systems 150 in network 162 may not have the range to reach all the communications systems 150 of network 164, all eTRUs 110 in networks 162 and 164 may receive the same data as each other due to one or more eTRUs 110 being within range of both networks 162 and 164.

Furthermore, since networks 160 and 162 may have the same data, and networks 162 and 164 may have the same data, networks 160 and 164 may have the same data, even though the range of any single communications system 150 of any eTRU in network 160 cannot reach that of any single communication system 150 of any eTRU 110 in network 164. It should also be noted, that although FIG. 1 shows that there are three separate local networks (160, 162, and 164), there, may be more or less networks present.

Figure 2:
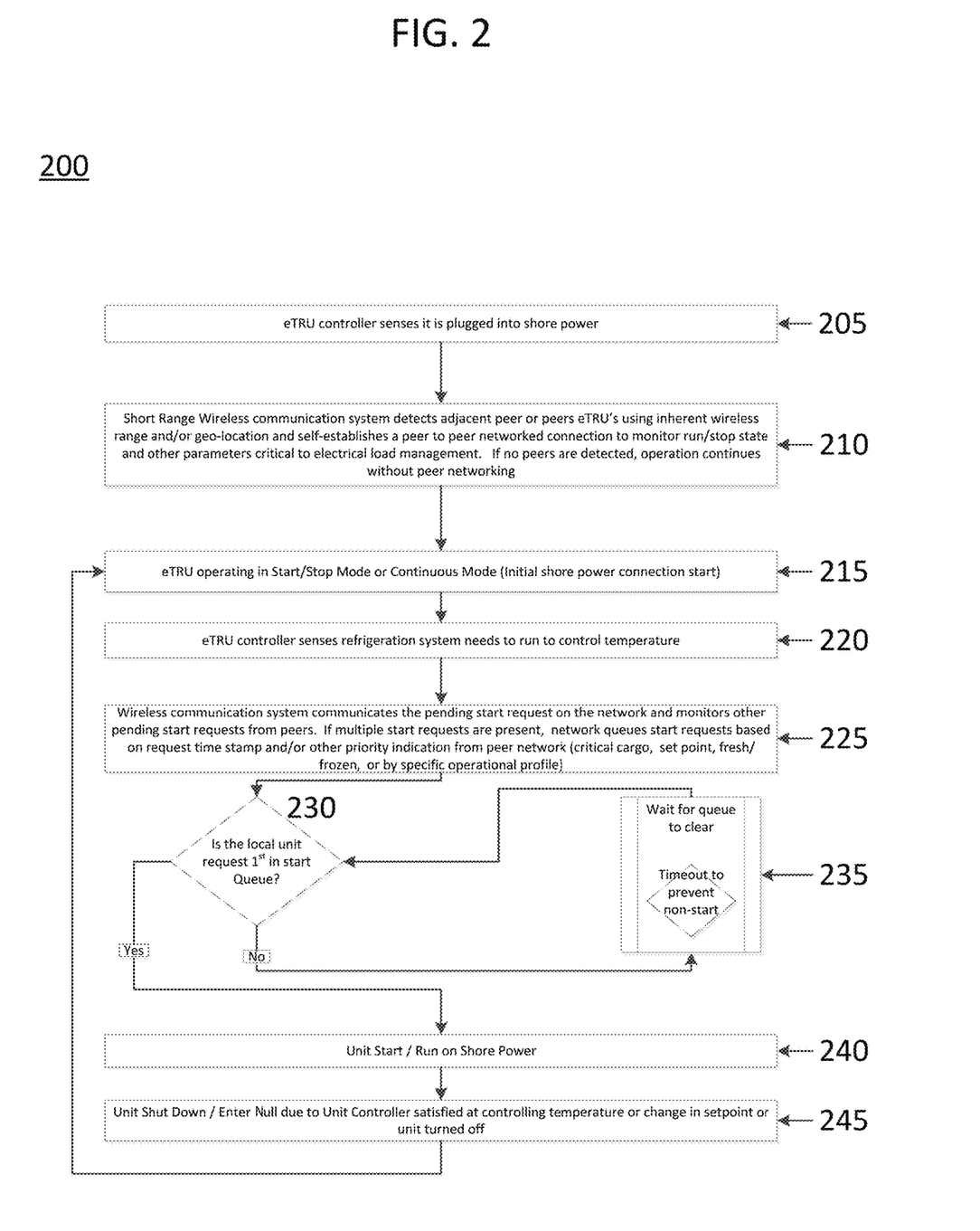
FIG. 2 illustrates an example of a method of power demand management via short range wireless communication, according to an embodiment.

With continued reference to the drawings, FIG. 2 illustrates an example of method 200 of power demand management via short range wireless communication. In some embodiments, method 200 can be a method for eTRU load side power demand management via peer to peer short range wireless communication. Method 200 is merely exemplary, and can include additional elements not specifically mentioned herein. Additionally, and for example, some of the blocks in the flow chart may be able to occur in an order different than that depicted in the flow chart of FIG. 2.

Method 200 comprises block 205, wherein an eTRU controller senses that it is plugged into shore power. The eTRU can be eTRU 110 of FIG. 1. It should also be noted, that although 205 mentions that the controller senses that it is connected to shore power, it can also be manually entered that shore power is now in use.

Method 200 also comprises block 210, wherein a wireless communication system detects one or more adjacent peer eTRUs. The wireless communication system can be the same as wireless communication system 150 from FIG. 1. In some embodiments, the communication system detects the one or more adjacent peer eTRUs using inherent wireless range and/or geo-location. Furthermore, in the same or other embodiments, the two or more connected eTRUs (through the respective communications systems and controllers) establish a peer to peer networked connection. Such a connection allows the connected eTRUs to monitor parameters, such as, for example, run/stop state, critical to electrical load management.

If the eTRU should not detect any peer, the operation of that eTRU can continue without peer networking.

Block 215 comprises the eTRU operating in start/stop mode or continuous mode. Block 215 can occur when there is an initial shore power connection start.

Method 200 further comprises block 220, wherein the eTRU controller senses that the refrigeration system of the eTRU needs to run in order to control the temperature of the unit. It should be noted that any system or method can be used to determine whether the refrigeration system needs to run, including manual and automatic systems.

After determining that the eTRU needs to start the refrigeration unit, method 200 in block 225 comprises the communication system of the eTRU communicating the pending start request to the network. Furthermore, the pending start requests from the peers in the network are also monitored. If multiple start requests are present, in some embodiments the network queues start requests based on a time stamp. In the same or other embodiments, other priority indication from the peer network may trump the time stamps. Such indications may include, for example, critical cargo, set points, fresh vs. frozen cargo, specific operation profile, etc. It should be noted that managers of the present invention may set up any sort of indications to prioritize queue start times.

Once the start request has been made, as represented by block 230, the eTRU determines whether it has priority in the start queue of the network. If the eTRU that made the request does not have priority over all the other requests for starts in the network, as shown in block 235, the eTRU will timeout to prevent a non-start and will wait for the eTRUs with priority in the queue to start.

On the other hand, if the eTRU has priority over all its peers in the network queue, the unit will start, as shown in block 240. A unit starting can mean that the eTRU will start up its refrigeration unit via shore power.

Finally, once the controller of the eTRU is satisfied with the temperature of the refrigeration unit, the unit can enter shut down/enter null, as shown in block 245 of method 200. It should also be noted, that the eTRU controller can shut down the refrigeration unit for other reasons. For example, a setpoint in the unit can be changed, the unit can be manually turned off, or the eTRU needs to exit the location.

If the eTRU is to remain at the location, as shown in FIG. 2, the eTRU can operate in start/stop mode or continuous mode (block 215) until the controller once again senses that refrigeration system needs to run again to control temperature.

Figure 3:
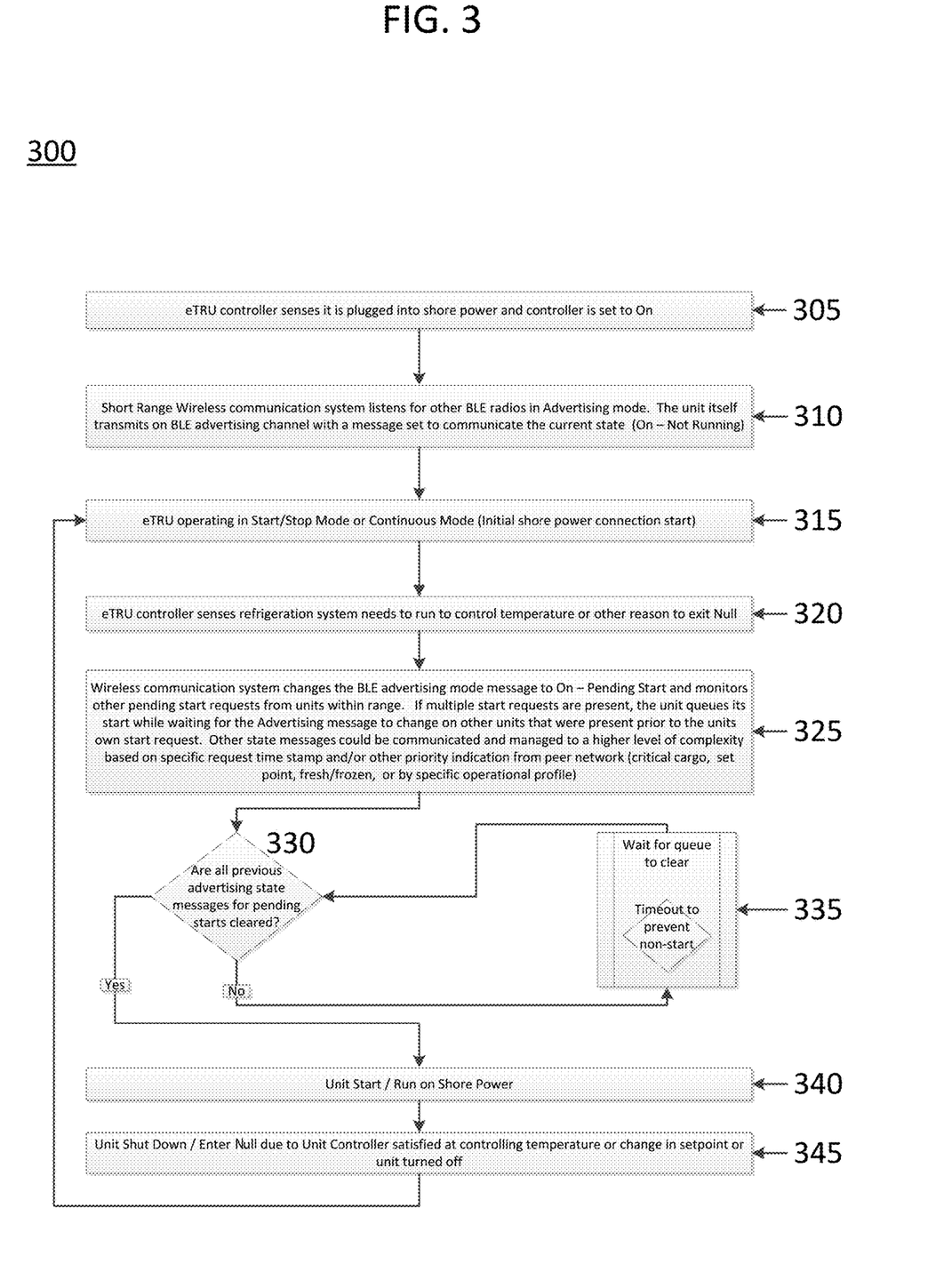
FIG. 3 illustrates an example of a method of power demand management via BLE advertising channel features, according to an embodiment.

With continued reference to the drawings, FIG. 3 illustrates an example of method 300 of power demand management via short range wireless communication. In some embodiments, method 300 can be a method for eTRU load side power demand management via use of BLE advertising channel features. Method 300 is merely exemplary, and can include additional elements not specifically mentioned herein. For example, some of the blocks in the flow chart may be able to occur in an order different than that depicted in the flow chart of FIG. 3.

Method 300 comprises block 305, wherein an eTRU controller senses that it is plugged into shore power and the controller is set to On. The eTRU can be eTRU 110 of FIG. 1. It should also be noted, that although 305 mentions that the controller senses that it is connected to shore power, it can also be manually entered that shore power is now in use.

Method 300 also comprises block 310, wherein a wireless communication system listens for other BLE radios in advertising mode. The wireless communication system can be the same as wireless communication system 150 from FIG. 1. In some embodiments, the communication system itself transmits on BLE advertising channel with a message to communicate the current state of the eTRU. Examples of current states can include On-Running, On-Not Running,) Off, etc. Such advertising allows eTRUs to monitor parameters, such as, for example, run/stop state, critical to electrical load management.

If the eTRU should not detect any other eTRUs, the operation of that eTRU can continue without communicating with other eTRUs.

Block 315 comprises the eTRU operating in start/stop mode or continuous mode. Block 315 can occur when there is an initial shore power connection start.

Method 300 further comprises block 320, wherein the eTRU controller senses that the refrigeration system of the eTRU needs to run to control the temperature of the unit. It should be noted that any system or method can be used to determine whether the refrigeration system needs to run, including manual and automatic systems.

After determining that the eTRU needs to start the refrigeration unit, method 300 in block 325 comprises the communication system of the eTRU changing the advertising mode message to "On-Pending Start". It should be noted that this is just an example of a message that can be advertised and any number of different messages can be advertised in its place. Furthermore, the pending start requests from the peers within the range of the eTRU are also monitored. If multiple start requests are present, in some embodiments the eTRU queues its start while waiting for the advertising message to change on other eTRUs that were present prior to the units' own start request time. In the same or other embodiments, other priority messages from eTRUs within range may trump the time stamps. Such messages may include, for example, critical cargo, set points, fresh vs. frozen cargo, specific operation profile, etc. It should be noted that managers of the present invention may set up any sort of indications to prioritize queue start times.

Once the start request has been made, as represented by block 330, the eTRU determines whether other previous advertising state messages for pending starts are cleared, or alternatively, whether it has priority over other pending start advertising messages. If the eTRU does not have priority over all the other advertised pending starts in the area, as shown in block 335, the eTRU will timeout to prevent a non-start and will wait for the eTRUs with priority in the queue to start.

On the other hand, if the eTRU has priority over all its peers in the area, the unit will start, as shown in block 340. A unit starting can mean that the eTRU will start up its refrigeration unit via shore power.

Finally, once the controller of the eTRU is satisfied with the temperature of the refrigeration unit, the unit can enter shut down/enter null, as shown in block 345 of method 300. It should also be noted, that the eTRU controller can shut down the refrigeration unit for other reasons. For example, a setpoint in the unit can be changed, the unit can be manually turned off, or the eTRU needs to exit the location.

If the eTRU is to remain at the location, as shown in FIG. 3, the eTRU can operate in start/stop mode or continuous mode (block 315) until the controller once again senses that refrigeration system needs to run again to control temperature.

Figure 4:
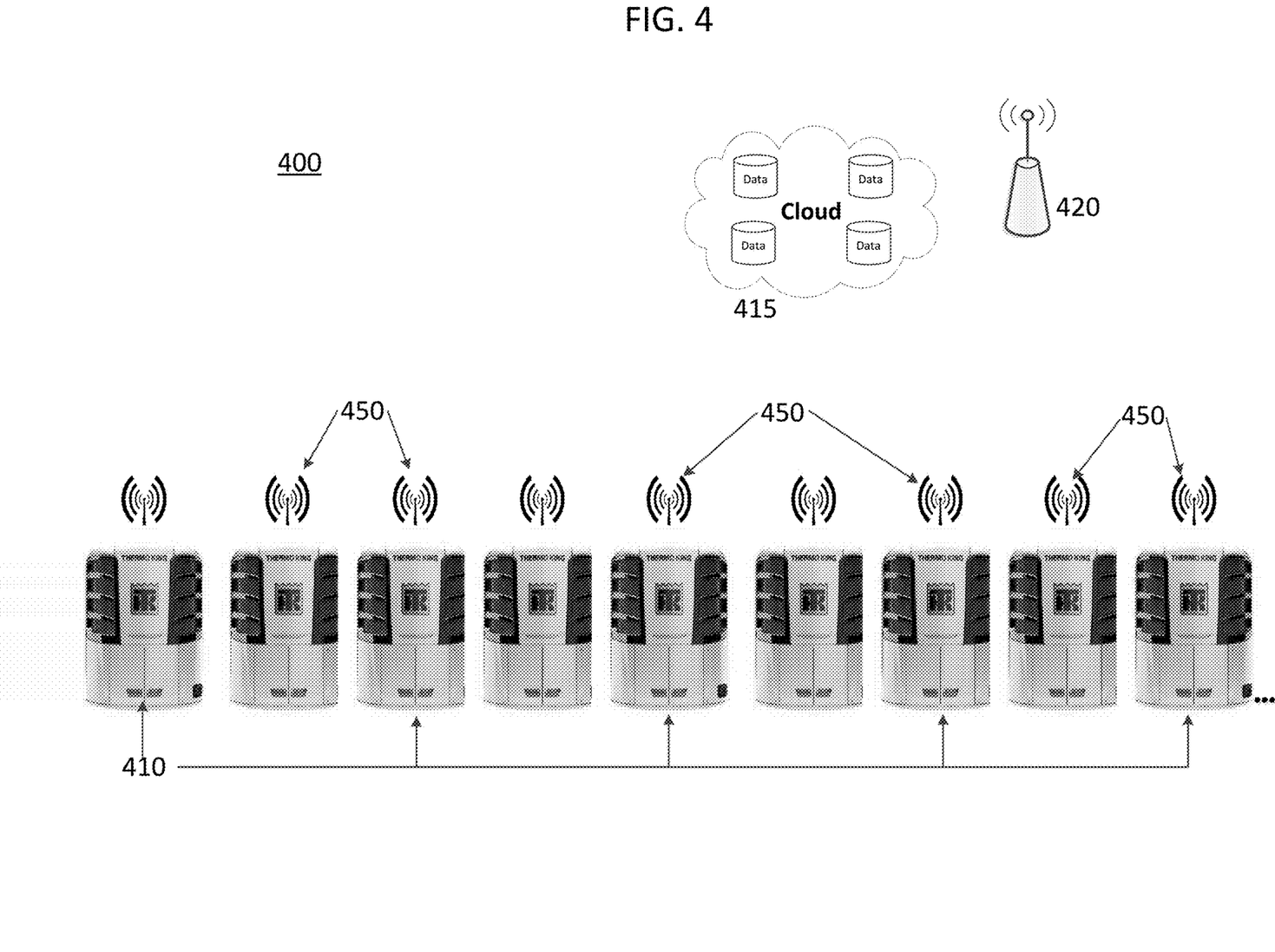
FIG. 4 illustrates an example of a system for eTRU power demand management, according to an embodiment.

With continued reference to the drawings, FIG. 4 illustrates an overview of a system 400 for eTRU power demand management, according to an embodiment. System 400 in some embodiments, can be considered an eTRU load side power demand management system via wireless networking, geolocation, and/or cloud connectivity. System 400 is merely exemplary and is not limited to the embodiment presented herein. System 400 can be employed in many different embodiments or examples not specifically depicted or described herein.

System 400 can comprise 1 or more eTRUs 410. Although there are nine eTRUs 410 shown in the example of FIG. 4, there can be more or less eTRUs. In some examples, the eTRUs 410 of system 400 are all located at a single site. The site can be any site in which there may be multiple eTRUs needing shore power. For example, the site can be a warehouse, a truck stop, a drop site, etc. Furthermore, in some embodiments, some locations (such as, for example, a warehouse) can have more than one site. eTRUs 410 can be the same as or similar to eTRUs 110 (FIG. 1).

As shown in FIG. 4, each of the eTRUs can comprise a wireless communication system 450. In some embodiments, the communication system can comprise a router that connects to a Wi-Fi network 420. In the same or other embodiments, the Wi-Fi network 420 can connect to the cloud 415. It should be noted that connections other than Wi-Fi can be used. For example, terrestrial mobile can be used. Furthermore, it is not necessary for Wi-Fi network 420 to connect to the cloud, as other types of networks can be used. For example, the Wi-Fi network 420 can be connected to a wired network.

In system 400, the communication systems 450 of the eTRUs 410 communicate with the Wi-Fi network 420, which is connected to the cloud 415. In this example, communication systems 450 communicate with the cloud 415. As opposed to the eTRUs working together to queue the start of the refrigeration units (as depicted in the examples presented in FIGS. 1-3), the queueing of the start times and/or priority can be done on the backend in a cloud (or other network) infrastructure.

Figure 5:
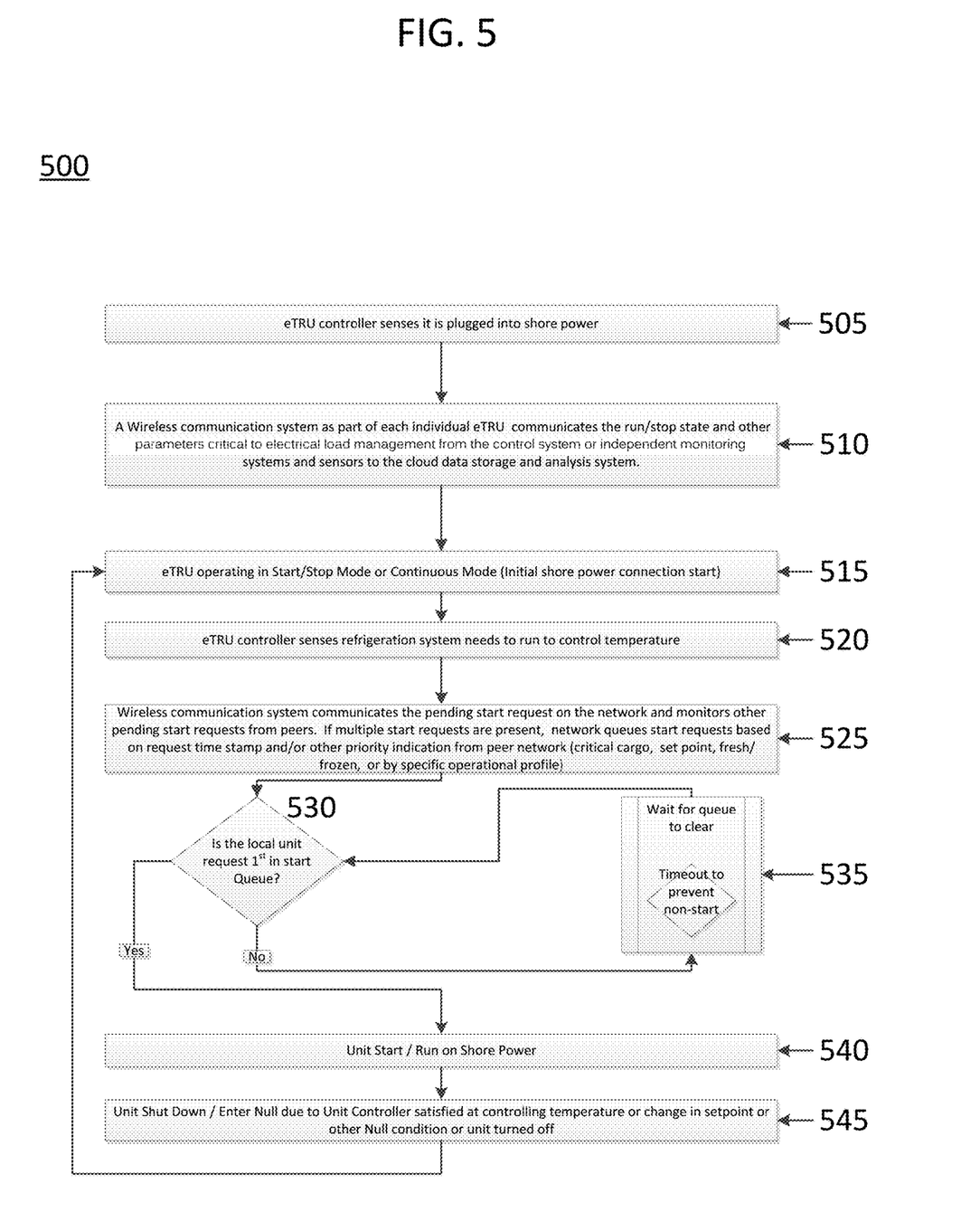
FIG. 5 illustrates an example of a method of power demand management via wireless networking, according to an embodiment.

With continued reference to the drawings, FIG. 5 illustrates an example of method 500 of power demand management via wireless communication. In some embodiments, method 500 can be a method for eTRU load side power demand management via wireless to cloud networked operation and queuing. Method 500 is merely exemplary, and can include additional elements not specifically mentioned herein. For example, some of the blocks in the flow chart may be able to occur in an order different than that depicted in the flow chart of FIG. 5.

Method 500 comprises block 505, wherein an eTRU controller senses that it is plugged into shore power. The eTRU can be eTRU 410 of FIG. 4. It should also be noted, that although 505 mentions that the controller senses that it is connected to shore power, it can also be manually entered that shore power is now in use.

Method 500 also comprises block 510, wherein a wireless communication system of each eTRU communicates the run/stop status and/or other parameters to the electrical load management. The wireless communication system can be the same as wireless communication system 450 from FIG. 4. In some embodiments, the communication system detects the one or more adjacent peer eTRUs using inherent wireless range and/or geo-location. Furthermore, in the same or other embodiments, the two or more connected eTRUs (through the respective communications systems and controllers) may establish a peer to peer networked connection. Such a connection allows the connected eTRUs to monitor parameters, such as, for example, run/stop state, and/or other parameters critical to electrical load management.

If the eTRU should not detect any peer, the operation of that eTRU can continue without peer networking.

Block 515 comprises the eTRU operating in start/stop mode or continuous mode. Block 515 can occur when there is an initial shore power connection start.

Method 500 further comprises block 520, wherein the eTRU controller senses that the refrigeration system of the eTRU needs to run in order to control the temperature of the unit. It should be noted that any system or method can be used to determine whether the refrigeration system needs to run, including manual and automatic systems.

After determining that the eTRU needs to start the refrigeration unit, method 500 in block 525 comprises the communication system of the eTRU communicating the pending start request to the network. Furthermore, the pending start requests from the peers in the network are also monitored. If multiple start requests are present, in some embodiments the network queues start requests based on the time stamp. In the same or other embodiments, other priority indication from the peer network may trump the time stamps. Such indications may include, for example, critical cargo, set points, fresh vs. frozen cargo, specific operation profile, etc. It should be noted that managers of the present invention may set up any sort of indications to prioritize queue start times.

In this and other embodiments the time stamp can be determined from the operations of blocks 505, 510, 515, 520 and/or 525 as well as other selected events or conditions. Time stamps in the embodiments of FIGS. 2 and 3 can, similarly be determined from the operations, respectively, of blocks 205, 210, 215, 220, 225, 230, and/or 235 and 305, 310, 315, 320, and/or 325, as well as other selected events or conditions.

Once the start request has been made, as represented by block 530, the eTRU determines whether it has priority in the start queue of the network. If the eTRU that made the request does not have priority over all the other requests for starts in the network, as shown in block 535, the eTRU will timeout to prevent a non-start and will wait for the eTRUs with priority in the queue to start.

On the other hand, if the eTRU has priority over all its peers in the network queue, the unit will start, as shown in block 540. A unit starting can mean that the eTRU will start up its refrigeration unit via shore power.

Finally, once the controller of the eTRU is satisfied with the temperature of the refrigeration unit, the unit can enter shut down/enter null, as shown in block 545 of method 500. It should also be noted, that the eTRU controller can shut down the refrigeration unit for other reasons. For example, a setpoint in the unit can be changed, the unit can be manually turned off, or the eTRU needs to exit the location.

If the eTRU is to remain at the location, as shown in FIG. 5, the eTRU can operate in start/stop mode or continuous m-ode (block 515) until the controller once again senses that refrigeration system needs to run again to control temperature.

In additional embodiments, the methods of communication between eTRUs or between one or more eTRUs and a network administration can comprise via Power Line Communications (PLC), including such as set out in SAE J2497; 2012 Jul. 30, incorporated herein in its entirety.

Prioritization of eTRUs in a queue may include methods comprising several steps, weighting and/or analysis. For example, an eTRU with load sensors showing the trailer as empty may be moved to the end of the queue or otherwise assigned a lesser prioritization than eTRUs having temperature sensitive contents. However, a trailer shown as empty may be still assigned a start-up of its refrigeration system in the queue at an appropriate time if the trailer should be pre-cooled for loading of temperature sensitive freight. Such pre-cooling can be assigned manually or by load scheduling systems or otherwise in relation to the anticipated use of the trailer. Cooling or pre-cooling queue prioritization can also take into account ambient temperature conditions at the location of the queued eTRUs, calculations of anticipated temperature rise in the individual or group of eTRUs at a location such as at least partially anticipated movement of the eTRUs, the temperature sensitivity of the contents of the eTRU, allowable temperature variation of the contents of the eTRU. Further queue prioritization can take into account unloading schedules for eTRU's as well as ambient conditions at the unloading site(s) and factors representing an anticipated delay in cooling of eTRU contents once they have been unloaded at particular site(s). Furthermore, extra cooling (e.g., cooling to a sub-normal temperature) can be specified and/or prioritized to counter-balance expected warming during delivery or unloading or unloading with delayed cooling of the eTRU contents.

Additionally, prioritization queuing may take into account local power grid loading status at the location of the eTRUs, the availability or relative availability of local renewable energy to the location of the eTRUs, and/or the applicable power usage strategy (including if appropriate, pricing, usage, contracted rates, anticipated or instantaneously available power pricing) at the location hosting the eTRUs, individual electrical power factors that may be generated for particular freight contents (including, such as may be specified by the owner of the freight contents, including for example, acceptable temperature variations in freight, and specified pre-cooling in anticipation of unloading warm-up of freight).

Although the invention has been described with reference to specific embodiments, it will be understood by those skilled in the art that various changes can be made without departing from the spirit or scope of the invention. Accordingly, the disclosure of embodiments is intended to be illustrative of the scope of the invention and is not intended to be limiting. It is intended that the scope of the invention shall be limited only to the extent required by the appended claims. To one of ordinary skill in the art, it will be readily apparent that the semiconductor device and its methods of providing the semiconductor device discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

According to embodiments of the present invention and with regard to the aspects described below, any aspects 1-20 can be combined with any other of aspects 1-20.

Aspect 1. A system for power demand management, comprising:
at least one eTRU, and
a communications system;
wherein the communications system communicates with one or more additional communications systems of one or more additional eTRUs; and
wherein the at least one eTRU determines a priority to start compared to the one or more additional eTRUs.

Aspect 2. The system of aspect 1, further comprising a queue listing the relative priorities of the at least one eTRU and the one or more additional eTRUs.

Aspect 3. The system of aspect 2, the queue is communicated between the at least one eTRU and the one or more additional eTRUs.

Aspect 4. The system of aspect 1, wherein the communications system comprises peer to peer networking.

Aspect 5. The system of aspect 1, wherein the communications system comprises BLE advertising.

Aspect 6. The system of aspect 1, wherein the communications system comprises connections to Wi-Fi.

Aspect 7. A method of power demand management, comprising:
an eTRU sensing that it has connected to shore power;
detecting one or more additional eTRUs in the vicinity;
communicating with the one or more additional eTRUs a pending start;
determining a priority of pending starts; and
starting a refrigeration unit of the eTRU when it has priority over other the one or more additional eTRUs.

Aspect 8. The method of aspect 7, wherein the communicating with the one or more additional eTRUs comprises using a peer to peer network.

Aspect 9. The method of aspect 8, wherein the communicating with the one or more additional eTRUs comprises communicating a pending start request.

Aspect 10. The method of aspect 7, wherein the communicating with the one or more additional eTRUs comprises using BLE advertising.

Aspect 11. The method of aspect 10, wherein the communicating with the one or more additional eTRUs comprises changing the BLE advertising mode to indicate that the eTRU is pending a start.

Aspect 12. The method of aspect 7, further comprising sensing that a refrigeration unit of the eTRU needs to be activated to control a temperature.

Aspect 13. The method of aspect 7, wherein priority is based upon a time stamp of the pending start of each of the eTRUs.

Aspect 14. The method of aspect 7, wherein priority is based upon more than one factor.

Aspect 15. The method of aspect 7, wherein the starting a refrigeration unit of the eTRU comprises running the refrigeration unit on shore power.

Aspect 16. The method of aspect 7, further comprising the one or more additional eTRUs communicating the pending start with a second set of one or more additional eTRUs.

Aspect 17. A method for eTRU load side power demand management, comprising:
sensing by an eTRU a connection to shore power;
detecting a second eTRU in the vicinity;
determining that the eTRU needs to power on a refrigeration unit;
communicating to the second eTRU that the eTRU is in a state of pending start;
determining whether the pending start of the eTRU has priority over any other pending starts; and
powering on the refrigeration unit of the eTRU once the pending start of the eTRU has priority over the other pending starts.

Aspect 18. The method of aspect 17, wherein the eTRU communicates to the second eTRU via peer to peer networking.

Aspect 19. The method of aspect 17, wherein the eTRU communicates to the second eTRU via BLE advertising.

Aspect 20. The method of aspect 17, wherein the eTRU communicates to the second eTRU comprises the use of the cloud.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for power demand management, comprising:
at least one electrically powered transport refrigeration unit (eTRU) having a controller operatively connected to a first
communications system associated with the at least one eTRU;
wherein the first communications system communicates via a communications network with one or more additional communications systems operatively connected to and associated with, respectively, one or more additional eTRUs; and
wherein, based at least in part on the communications via the communications network the controller of at least one of the communicating eTRU determines a priority to start compared to the one or more additional communicating eTRUs.

2. The system of claim 1, further comprising a queue listing the relative priorities of the at least one eTRU and the one or more additional eTRUs.

3. The system of claim 2, wherein the queue is communicated between the at least one eTRU and the one or more additional eTRUs.

4. The system of claim 1, wherein the communications network comprises peer to peer networking.

5. The system of claim 1, wherein the communications network comprises BLE advertising.

6. The system of claim 1, wherein the communications network comprises connections to Wi-Fi.

7. A method of power demand management, comprising:
a first electrically powered transport refrigeration unit (eTRU) sensing that it has connected to shore power;
the first eTRU detecting one or more additional eTRUs in the vicinity also connected to the shore power;
the first eTRU communicating with the one or more additional eTRUs a pending start;
determining a priority of pending starts; and
starting a refrigeration unit of the first eTRU when it has priority over the one or more additional eTRUs also connected to the shore power.

8. The method of claim 7, wherein the communicating with the one or more additional eTRUs comprises using a peer to peer network.

9. The method of claim 8, wherein the communicating with the one or more additional eTRUs comprises communicating a pending start request.

10. The method of claim 7, wherein the communicating with the one or more additional eTRUs comprises using BLE advertising.

11. The method of claim 10, wherein the communicating with the one or more additional eTRUs comprises changing the BLE advertising mode to indicate that the eTRU is pending a start.

12. The method of claim 7, further comprising sensing that a refrigeration unit of the eTRU needs to be activated to control a temperature.

13. The method of claim 7, wherein priority is based upon a time stamp of the pending start of each of the eTRUs.

14. The method of claim 7, wherein priority is based upon more than one factor.

15. The method of claim 7, wherein the starting a refrigeration unit of the eTRU comprises running the refrigeration unit on shore power.

16. The method of claim 7, further comprising the one or more additional eTRUs communicating the pending start with a second set of one or more additional eTRUs.

17. A method for eTRU load side power demand management, comprising:
sensing by a first electronically powered transport refrigeration unit (eTRU) a connection to shore power;
detecting a second eTRU in the vicinity also connected to the shore power;
determining that the first eTRU needs to power on a refrigeration unit;
communicating to the second eTRU that the first eTRU is in a state of pending start;
determining whether the pending start of the first eTRU has priority over any other pending starts of eTRUs connected to the shore power; and
powering on the refrigeration unit of the first eTRU once the pending start of the first eTRU has priority over the other pending starts.

18. The method of claim 17, wherein the first eTRU communicates to the second eTRU via peer to peer networking.

19. The method of claim 17, wherein the first eTRU communicates to the second eTRU via BLE advertising.

20. The method of claim 17, wherein the first eTRU communicates to the second eTRU comprises the use of the cloud.

* * * * *